United States Patent
Tiwari et al.

(10) Patent No.: US 7,673,091 B2
(45) Date of Patent: Mar. 2, 2010

(54) METHOD TO HIDE OR REDUCE ACCESS LATENCY OF A SLOW PERIPHERAL IN A PIPELINED DIRECT MEMORY ACCESS SYSTEM

(75) Inventors: Ashutosh Tiwari, Chattisgargh (IN); Subrangshu Kumar Das, West Bengal (IN)

(73) Assignee: Texas Instruments Incorporated, Dallas, TX (US)

(*) Notice: Subject to any disclaimer, the term of this patent is extended or adjusted under 35 U.S.C. 154(b) by 46 days.

(21) Appl. No.: 12/107,274

(22) Filed: Apr. 22, 2008

(65) Prior Publication Data
US 2008/0270668 A1 Oct. 30, 2008

(30) Foreign Application Priority Data
Apr. 24, 2007 (IN) .......................... 866/CHE/2007

(51) Int. Cl.
*G06F 13/00* (2006.01)
(52) U.S. Cl. ............................ 710/308; 710/28; 710/35
(58) Field of Classification Search ................... 710/22, 710/28, 35, 52, 56, 57, 308, 310
See application file for complete search history.

(56) References Cited

U.S. PATENT DOCUMENTS

| | | | |
|---|---|---|---|
| 5,828,856 A * | 10/1998 | Bowes et al. | 710/308 |
| 6,301,632 B1 * | 10/2001 | Jaramillo | 710/105 |
| 6,574,691 B1 * | 6/2003 | Jirgal et al. | 710/100 |
| 6,954,818 B2 * | 10/2005 | Kent | 710/306 |
| 7,165,125 B2 * | 1/2007 | Lissel et al. | 710/22 |
| 7,373,437 B2 * | 5/2008 | Seigneret et al. | 710/22 |
| 2003/0172242 A1 * | 9/2003 | Uneyama et al. | 711/167 |
| 2005/0091458 A1 * | 4/2005 | Sato et al. | 711/138 |
| 2005/0182886 A1 * | 8/2005 | Edirisooriya et al. | 710/310 |
| 2006/0015672 A1 * | 1/2006 | Boily | 710/310 |
| 2007/0143521 A1 * | 6/2007 | Raju et al. | 710/310 |

* cited by examiner

*Primary Examiner*—Glenn A Auve
(74) *Attorney, Agent, or Firm*—Robert D. Marshall, Jr.; Wade J. Brady, III; Frederick J. Telecky, Jr.

(57) ABSTRACT

A bus bridge between a high speed DMA bus and a lower speed peripheral bus sets a threshold for minimum available buffer space to send a read request dependent upon a frequency ratio and the DMA read latency. Similarly, a threshold for minimum available data for a write request depends on the frequency ratio and the DMA write latency. The bus bridge can store programmable values for the DMA read latency and write latency.

20 Claims, 2 Drawing Sheets

METHOD TO HIDE OR REDUCE ACCESS LATENCY OF A SLOW PERIPHERAL IN A PIPELINED DIRECT MEMORY ACCESS SYSTEM

TECHNICAL FIELD OF THE INVENTION

The technical field of this invention is direct memory access systems.

BACKGROUND OF THE INVENTION

System-on-Chip (SoC) designs often include several application specific peripherals integrated with a direct memory access (DMA) unit. The DMA unit allows these peripherals to transfer data without a high degree of intervention by the central processing unit (CPU). Peripherals initiate read/write transfers as required. A bus bridge arbitrates and grants control of the bus to one peripheral. Since the effective utilization of DMA bandwidth determines the overall system performance, it is very important that the peripherals never throttle throughput by halting transfers through deactivation of the ready/acknowledge signal after getting control of the bus.

SUMMARY OF THE INVENTION

For system-on-chip systems to maintain high performance two considerations are of prime importance. First, slower peripheral devices in the system must not be allowed to throttle throughput by introducing halting conditions. Second, any latency introduced by interfacing high-speed devices to lower speed peripherals must be kept to a minimum. This invention directly addresses the second of these requirements while also meeting the first requirement. This invention uses system characteristics to reduce the total access latency incurred.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
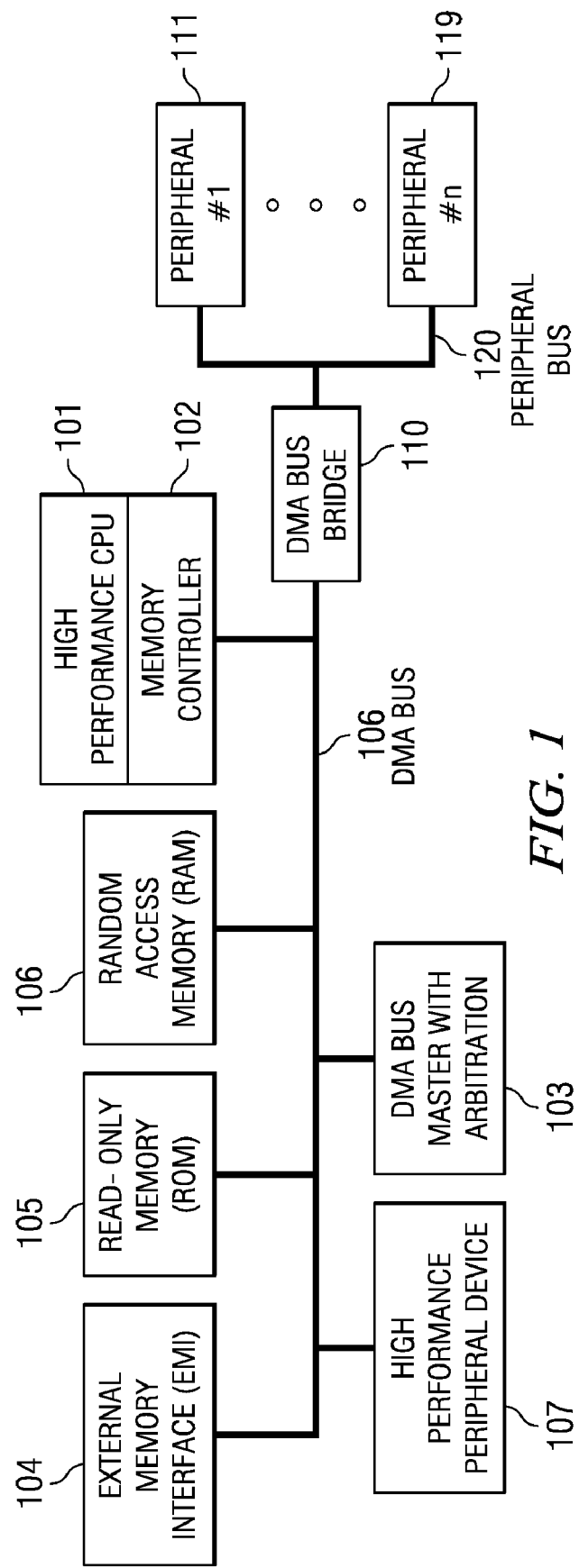
FIG. 1 illustrates the block diagram of an example system-on-chip system employing a bus bridge interfacing slow peripheral devices with a high speed DMA Bus according to the invention.

FIG. 1 illustrates a system that may use the methods of this invention. CPU 101 and memory controller 102 are master devices driving DMA Bus 100. Both CPU 101 and memory controller 102 can initiate a transfer. External memory interface (EMIF) 104, read only memory (ROM) 105, random access memory (RAM) 106 and high performance peripheral device 107 are master or slave devices according to the needs of the system. DMA bus master 103 arbitrates accesses to DMA bus 100. DMA bus master 103 controls all accesses by peripheral devices 111 through 119 via DMA bus bridge 110. DMA bus bridge 110 (shown in greater detail in FIG. 2) includes two FIFO devices, READ FIFO 222 and WRITE FIFO 221. Input and output clocking in separate frequency domains provide for smooth transition from the relatively high speed DMA bus 100 and the relatively slow speed peripheral bus 120. DMA bus bridge 110 also includes hardware that determines the readiness for a transfer. This hardware is programmable to meet varying system needs.

Figure 2:
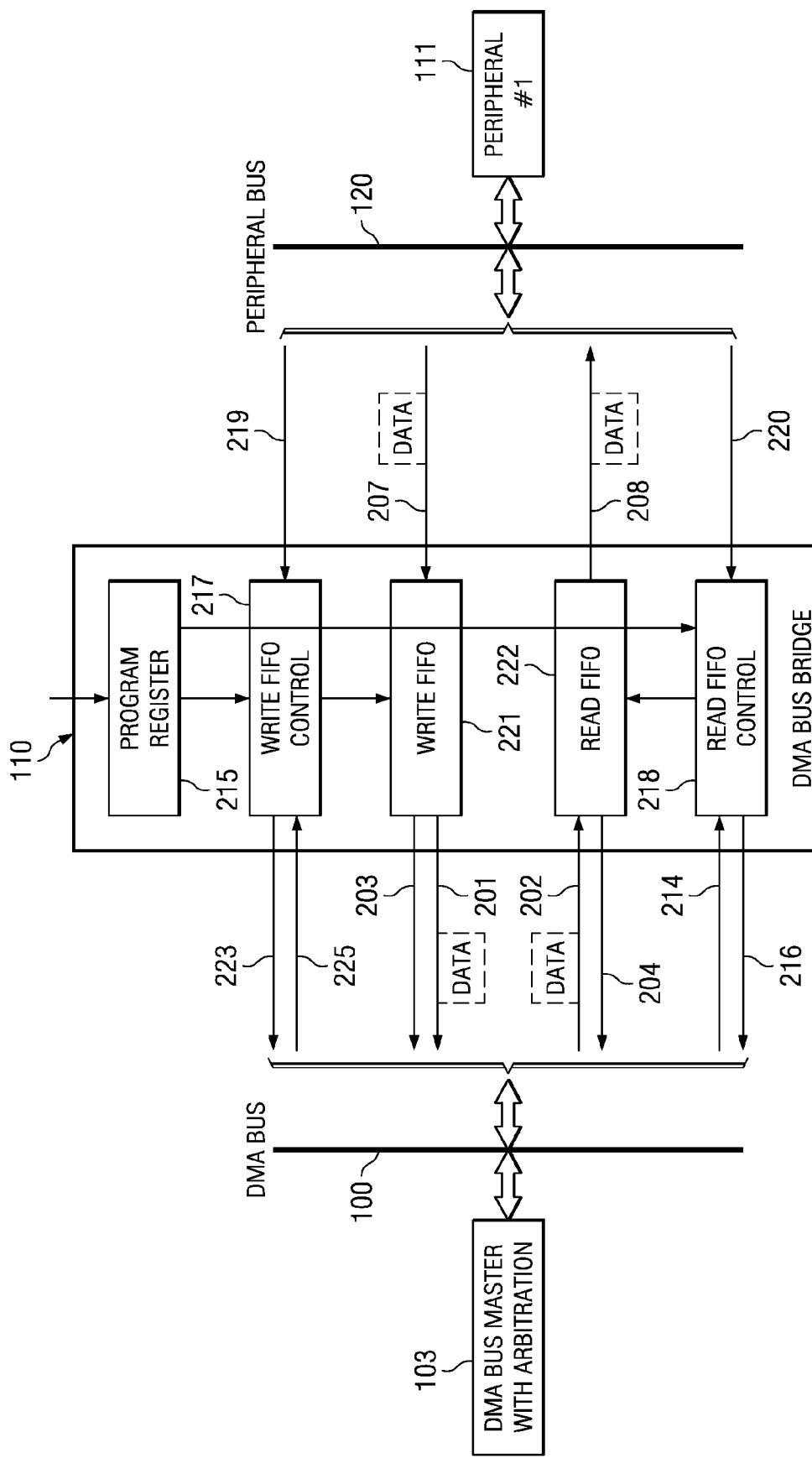
FIG. 2 illustrates the block diagram of an example bus bridge interfacing slow peripheral devices with a high speed DMA Bus according to the invention.

FIG. 2 illustrates the structure of an example DMA bus bridge 110 according to this invention. The invention is not limited to this implementation of DMA bus bridge 110. FIG. 2 clarifies the action of the system to reduce/hide access latency of the slow peripheral in a pipelined DMA system.

FIG. 2 illustrates the structure and crucial signals within DMA bus bridge 110. Peripheral 111 makes read requests to DMA bus master 103 via signals 220 and 216. DMA bus master 103 acknowledges the read requests via signal 214. DMA bus bridge 110 verifies via READ FIFO control 218, that read FIFO 222 has enough space available to hold the incoming data. Ready signal 204 sent to DMA bus master 103 begins read action. Data is received from DMA bus master 103 via DMA data bus 100 and is stored in read FIFO 222. Peripheral 111 receives incoming read data via bus 208. DMA bus bridge 110 includes a program register 215 that holds the threshold values for read and write as described in equations [1], [6] and [7] below.

Peripheral 111 makes write requests to DMA bus master 103 via signals 219 and 223. DMA bus master 103 acknowledges the write request via signal 225. DMA bus bridge 110 verifies via write FIFO control 217, that write FIFO buffer 221 has sufficient data to complete the write request. Ready signal 203 sent to DMA bus master 103 begins write action. Data passes from peripheral 111 to write FIFO 221 via bus 207 and is sent to DMA bus master 103 via bus 201.

When peripheral device 111 operates at a frequency slower than the DMA, DMA bus bridge 110 provides both frequency domain conversion through two clocks and sufficient buffering for smooth operation. An adverse effect of DMA bus bridge 110 is additional access latency at the start of each burst write and read transfer. This additional latency occurs because DMA bus bridge 110 waits for sufficient words to be available in write FIFO 221 before forwarding the write request and waits for sufficient empty space to be available in read FIFO 222 before forwarding read request to DMA bus master 103. This invention reduces the effect of any latency introduced by the bridge.

Upon a read request via path 220 from peripheral 111, DMA bus bridge 110 makes sure that it has minimum number of empty spaces, a threshold value, available in read FIFO 222 before forwarding the corresponding request to the DMA bus master 103 via path 216. This check makes sure that DMA bus bridge 110 can sustain the throughput requirement of DMA bus master 103. Read FIFO control 218 computes the number of empty spaces in Read FIFO 222 using read and write pointer values. Once the data is available DMA bus bridge 103 acknowledges the read request via signal 214. Data passes via bust 202 through DMA bus bridge 110. Read FIFO 222 can then send the data via bus 208 to peripheral 111 and on to the external interface.

The threshold value for read is:

$$THO\_READ = N(r-1)/r + 1 \qquad [1]$$

where: N is the transfer burst size; and r is frequency ratio between the DMA clock domain and the peripheral clock domain. From equation [1] the read latency incurred is:

$$LT\_READ = THO\_READ * r \text{ (in DMA cycles)} \qquad [2]$$

For write requests, before forwarding the request via path 223 to DMA bus master 103, DMA bus bridge 110 verifies that it can sustain the throughput requirement. This typically translates to a limitation on the minimum number of data words, a threshold value available in the write FIFO 221 before DMA bus bridge 110 can forward the write request. A part of this verification determines the number of words residing in write FIFO 221 that are ready for a write cycle. Write FIFO control 217 computes this number using write pointer and read pointer values.

The minimum number of words required, THO_WRITE, is:

$$THO\_WRITE = N(r-1)/r \quad [3]$$

where: N is the transfer burst size; and r is the frequency ratio between DMA clock domain and the peripheral clock domain. From equation [3] the write latency incurred is:

$$LT\_WRITE = THO\_WRITE * r \text{ (in DMA cycles)} \quad [4]$$

Once a read or write request is made to DMA bus master 103, it will take several cycles for DMA bus master 103 to come back with read data or accept the write data. This could be because of the pipeline depth of DMA bus master 103, the time taken to arbitrate between masters, the time taken by a slave device to service a request, etc. Assume that for a read and write, DMA bus master 103 takes LD_READ and LD_WRITE DMA cycles respectively. The total access latency LT_READ/LT_WRITE is:

$$LT\_READ = THO\_READ * r + LD\_READ \text{ (in DMA cycles)}$$

$$LT\_WRITE = THO\_WRITE * r + LD\_WRITE \text{ (in DMA cycles)} \quad [5]$$

DMA bus master 103 will need the write data from DMA bus bridge 110 only LD_WRITE cycles after making the write request. Similarly, DMA bus master 103 will be able to send read data to bridge only LD_READ cycles following the read request. This invention uses this fact to reduce the threshold requirement of DMA bus bridge 110 and thereby reduces the overall access latency. The modified threshold values (THM) are:

$$THM\_READ = THO\_READ - LD\_READ/r \quad [6]$$

$$THM\_WRITE = THO\_WRITE - LD\_WRITE/r \quad [7]$$

and the reduced access latencies are:

$$LTM\_READ = THO\_READ * r \quad [8]$$

$$LTM\_WRITE = THO\_WRITE * r \quad [9]$$

In this invention the initial latency LT for read and write transfers will be reduced by LD_READ/LD_WRITE cycles, respectively. For a complex DMA system, this initial latency may vary depending upon the traffic, requester priority, and other modifying factors. The threshold value is implemented as a software programmable parameter, making DMA bus bridge 110 useful in a wide range of designs without hardware modification.

What is claimed is:

1. A bus bridge placed between a direct memory access unit and a peripheral bus having a data transfer speed slower than the direct memory access unit comprising:
a read FIFO receiving data from said direct memory access unit and supplying data to a peripheral bus;
a read FIFO control connected to said direct memory access unit and said read FIFO operable to
receive read access requests from said direct memory access unit, and
grant read access to said read FIFO when said read FIFO has a minimum free space to store a burst of data from said direct memory access unit, said minimum free space equaling N(r−1)/r+1, where N equals the burst size and r equals a ratio between a speed of said direct memory access unit and a speed of said peripheral bus.

2. The bus bridge of claim 1, wherein:
said read FIFO receives data at a first speed and supplies data at a second slower speed.

3. The bus bridge of claim 1, wherein:
said read FIFO includes a threshold register storing a number corresponding to said minimum free space to permit read access.

4. The bus bridge of claim 1, further comprising:
a write FIFO receiving data from said peripheral bus and supplying data to said direct memory access unit;
a write FIFO control operable to
receive write access requests from said peripheral bus, and
grant write access to said write FIFO when said write FIFO stores a minimum available data to supply a direct memory access unit burst of data.

5. The bus bridge of claim 4, wherein:
said write FIFO receives data at a first speed and supplies data at a second faster speed.

6. The bus bridge of claim 4, wherein:
said write FIFO includes a write FIFO threshold register storing a number corresponding to said minimum available data to permit write access.

7. The bus bridge of claim 4, wherein:
said minimum available data equals N(r−1)/r, where N equals a burst size, r equals a ratio between a speed of said direct memory access unit and a speed of said peripheral bus.

8. A bus bridge apparatus placed between a direct memory access unit and a peripheral bus having a data transfer speed slower than the direct memory access unit comprising:
a write FIFO receiving data from said peripheral bus and supplying data to said direct memory access unit;
a write FIFO control operable to
receive write access requests from said peripheral bus, and
grant write access to said write FIFO when said write FIFO stores a minimum available data to supply a direct memory access unit burst of data, said minimum available data equaling N(r−1)/r, where N equals a burst size and r equals a ratio between a speed of said direct memory access unit and a speed of said peripheral bus.

9. The bus bridge of claim 8, wherein:
said write FIFO receives data at a first speed and supplies data at a second faster speed.

10. The bus bridge of claim 8, wherein:
said write FIFO includes a write FIFO threshold register storing a number corresponding to said minimum available data to permit write access.

11. A bus bridge placed between a direct memory access unit and a peripheral bus having a data transfer speed slower than the direct memory access unit comprising:
a read FIFO receiving data from said direct memory access unit and supplying data to a peripheral bus;
a read FIFO control connected to said direct memory access unit and said read FIFO operable to
receive read access requests from said direct memory access unit, and
grant read access to said read FIFO when said read FIFO has a minimum free space to store a burst of data from said direct memory access unit, said minimum free space equaling $N(r-1)/r+1-LD\_READ/r$, where: N equals the burst size; r equals a ratio between a speed of said direct memory access unit and a speed of said peripheral bus; and LD_READ is a read latency of the direct memory access unit from receipt of a read request until the direct memory access unit is able to send read data to the bus bridge in direct memory access unit cycles.

12. The bus bridge of claim 11, wherein:
said read FIFO receives data at a first speed and supplies data at a second slower speed.

13. The bus bridge of claim 11, wherein:
said read FIFO includes a threshold register storing a number corresponding to said minimum free space to permit read access.

14. The bus bridge of claim 11, further comprising:
a write FIFO receiving data from said peripheral bus and supplying data to said direct memory access unit;
a write FIFO control operable to
receive write access requests from said peripheral bus, and
grant write access to said write FIFO when said write FIFO stores a minimum available data to supply a direct memory access unit burst of data.

15. The bus bridge of claim 14, wherein:
said write FIFO receives data at a first speed and supplies data at a second faster speed.

16. The bus bridge of claim 14, wherein:
said write FIFO includes a write FIFO threshold register storing a number corresponding to said minimum available data to permit write access.

17. The bus bridge of claim 14, wherein:
said minimum available data equals $N(r-1)/r$, where N equals a burst size, r equals a ratio between a speed of said direct memory access unit and a speed of said peripheral bus.

18. A bus bridge apparatus placed between a direct memory access unit and a peripheral bus having a data transfer speed slower than the direct memory access unit comprising:
a write FIFO receiving data from said peripheral bus and supplying data to said direct memory access unit;
a write FIFO control operable to
receive write access requests from said peripheral bus, and
grant write access to said write FIFO when said write FIFO stores a minimum available data to supply a direct memory access unit burst of data, said minimum available data equaling $N(r-1)/r-LD\_READ/r$, where: N equals a burst size; r equals a ratio between a speed of said direct memory access unit and a speed of said peripheral bus; and LD_WRITE is a write latency of the direct memory access unit from receipt of a write request until the direct memory access unit requires write data from the bus bridge in direct memory access unit cycles.

19. The bus bridge of claim 18, wherein:
said write FIFO receives data at a first speed and supplies data at a second faster speed.

20. The bus bridge of claim 19, wherein:
said write FIFO includes a write FIFO threshold register storing a number corresponding to said minimum available data to permit write access.

* * * * *